US012637005B2

(12) United States Patent
Leaming et al.

(10) Patent No.: US 12,637,005 B2
(45) Date of Patent: May 26, 2026

(54) METHOD AND APPARATUS FOR A VEHICLE ACCESSORY MOUNT SYSTEM

(71) Applicant: XTC Motorsports LLC, Chandler, AZ (US)

(72) Inventors: Christopher R. Leaming, Gilbert, AZ (US); Michael J. Leaming, Gilbert, AZ (US)

(73) Assignee: XTC Motorsports LLC, Chandler, AZ (US)

( * ) Notice: Subject to any disclaimer, the term of this patent is extended or adjusted under 35 U.S.C. 154(b) by 89 days.

(21) Appl. No.: 18/883,327

(22) Filed: Sep. 12, 2024

(65) Prior Publication Data

US 2025/0091511 A1      Mar. 20, 2025

Related U.S. Application Data

(60) Provisional application No. 63/538,310, filed on Sep. 14, 2023.

(51) Int. Cl.
*F16M 11/14* (2006.01)
*B60R 1/06* (2006.01)
*F16C 11/06* (2006.01)

(52) U.S. Cl.
CPC ............ *B60R 1/06* (2013.01); *F16C 11/0623* (2013.01)

(58) Field of Classification Search
CPC .............................. B60R 1/06; F16C 11/0623
See application file for complete search history.

(56) References Cited

U.S. PATENT DOCUMENTS

| | | | | | |
|---|---|---|---|---|---|
| 2,091,203 | A | * | 8/1937 | Vidal | A47G 1/24 |
| | | | | | D6/309 |
| 11,248,648 | B2 | * | 2/2022 | Ye | F16C 11/106 |
| 2004/0238715 | A1 | | 12/2004 | March et al. | |
| 2018/0172065 | A1 | | 6/2018 | Stewart et al. | |
| 2018/0195661 | A1 | * | 7/2018 | Filipiak | F16C 11/0647 |

* cited by examiner

*Primary Examiner* — Amy J. Sterling
(74) *Attorney, Agent, or Firm* — Michael T. Wallace

(57)          ABSTRACT

A vehicle accessory mount system is provided that includes a ball-and-socket joint. The socket portion includes a non-metallic material, and the ball portion includes a metallic material whereby the non-metallic material exhibits elasticity to allow a surface of the socket portion to temporarily deform in order to conform to imperfections in the surface of the ball portion as the ball portion inserts into the socket portion under pressure. As the ball portion is caused to rotate within the socket portion under pressure, the elasticity of the socket portion allows a surface of the socket portion to adapt and conform to the changing locations of the imperfections of the ball portion in relation to the socket portion.

8 Claims, 2 Drawing Sheets

100

104

102

108

106

METHOD AND APPARATUS FOR A VEHICLE ACCESSORY MOUNT SYSTEM

FIELD OF THE INVENTION

The present invention generally relates to vehicle accessory mount systems, and more particularly to vehicle accessory mount systems with adjustable stabilization to maintain the orientation of the accessory while the vehicle is in use.

BACKGROUND

Certain conventional vehicle accessory mount systems often utilize ball-and-socket joints to mount the accessory to the vehicle. As such, a semi-permanent orientation and/or configuration of the attachment may be achieved while also allowing minor adjustments to be made to the position of the attachment. Such attachments may include side-view mirrors and/or rear-view mirrors that often require position adjustments necessitated by the physical attributes (e.g., height) of the various drivers of such vehicles.

The operational environment within which such vehicles operate often cause the attachments to change their orientation and/or configuration simply by the gravitational forces (G-forces) applied to the attachments during operation. Accordingly, conventional ball-and-socket joints have been enhanced to increase their resistance to unwanted orientation and/or configuration changes brought on by such G-forces.

Certain conventional enhancement efforts such as those described in U.S. Patent Application Publication 2018/0172065, for example, utilize an internal spring to urge the ball and socket together thereby applying a substantially constant frictional force that resists unwanted changes in the position of the associated mirror. Other conventional efforts (e.g., as described in U.S. Patent Application Publication 2004/0238715) utilize an external annular spring to urge the ball and socket portions together, but similarly utilize a substantially constant frictional force.

Such spring-based solutions, however, are unnecessarily complicated and do not provide the structural integrity required for certain environments (e.g., off-road applications). Further, the frictional resistance applied by conventional retention mechanisms is substantially constant and, therefore, does not allow for the adjustability of the frictional resistance magnitude required in order to account for dynamic environments.

Efforts continue, therefore, to improve ball-and-socket joint mount systems to allow adjustability in their retention mechanisms so that the magnitude of frictional resistance applied by such retention mechanisms may be optimized.

SUMMARY

To overcome limitations in the prior art, and to overcome other limitations that will become apparent upon reading and understanding the present specification, various embodiments of the present invention disclose a ball-and-socket joint that includes a ball portion made of a metallic material (e.g., stainless steel) and a socket portion made of a non-metallic material such as a polymer (e.g., a thermoplastic). The socket and ball may be movably attached to each other with an adjustable magnitude of pressure such that the shape of the socket may be deformed to increasingly/decreasingly conform to the shape of the ball as the magnitude of pressure is increased/decreased. Once sufficient pressure is applied, the socket-and-ball joint may allow adjustability of the attachment (e.g., movement of a vehicle's side mirror up and down) through purposeful adjustments made by a user of the vehicle, while also substantially preventing unwanted changes in the attachment's orientation due to applied G-forces during operation of the vehicle.

The modulus of elasticity of the non-metallic material used to construct the socket is such that its geometric shape (e.g., a spherical cavity) may be temporarily deformed to conform to the shape of the ball without exceeding the socket's elastic limit. As such, any imperfections that may exist on the surface of the ball that may cause the shape of the ball to depart from a particular geometric shape (e.g., a spherical shape), such as may be caused by machine tolerance limits or a machine process that somewhat deforms the surface of the ball from exhibiting the desired geometric shape, may be overcome by the elasticity of the socket. The elasticity of the socket, for example, facilitates deformation of the shape of the socket so that the deformed socket's shape may conform to the shape of the ball. As such, a greater surface area of the ball may be brought into direct communication with the socket as the surface of the socket elastically conforms to the irregular surface of the ball thereby increasing the static friction established between the ball and the socket.

In accordance with one embodiment of the invention, a vehicle accessory mount system comprises a vehicle and a vehicle accessory coupled to the vehicle. The vehicle accessory includes a socket comprised of a non-metallic material, the socket including an interior portion having a first surface. The vehicle accessory further includes a shaft including a ball portion having a second surface movably coupled to the first surface. The vehicle accessory further includes a back plate coupled to the socket and a face place coupled to the shaft. The back and face plates are configured to increase a pressure applied by the ball portion onto the interior portion to temporarily deform a first shape of the first surface to conform to a shape of the second surface.

In accordance with another embodiment of the invention, a method of mounting a vehicle accessory to a vehicle comprises assembling a vehicle accessory mount. The assembly including movably displacing a ball portion of a shaft into an interior portion of a socket, varying a pressure exerted onto a first surface of the interior portion by a second surface of the ball portion and temporarily deforming a first shape of the first surface to substantially conform to a shape of the second surface. The method further comprises coupling the vehicle accessory mount to the vehicle accessory via a first set of fasteners and movably coupling the vehicle accessory to the vehicle.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
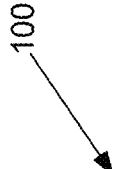
FIG. 1 illustrates side-view mirrors attached to a vehicle in accordance with an embodiment of the present invention.
Figure 1:
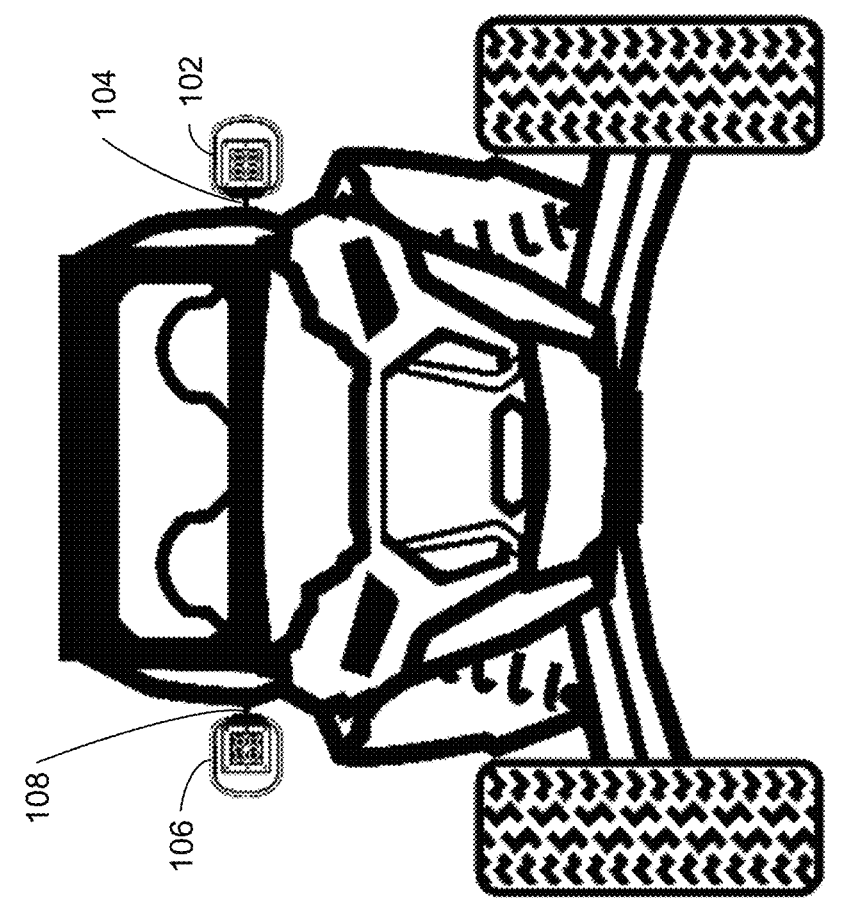

Generally, the various embodiments of the present invention are applied to a vehicle accessory mount system that utilizes a ball-and-socket joint that employs a relatively elastic material for the socket and a relatively inelastic material for the ball. As pressure is applied to join the ball to the socket, the elasticity of the socket maximizes surface area contact between the socket and the ball thereby increasing a magnitude of static friction developed between a surface of the ball and a surface of the socket. As such, movement of the associated attachment (e.g., a side-view or rear-view mirror) may be minimized by the ball-and-socket joint so that the attachment may remain in its pre-configured position with respect to the vehicle.

As per one example, the ball portion of the joint may be manufactured (e.g., machined or extruded) from a relatively rigid material (e.g., stainless steel). By virtue of the manufacturing process, the surface of the ball may exhibit imperfections that cause the surface of the ball to deviate from its intended geometry (e.g., a perfect sphere). A socket portion, on the other hand, may be manufactured (e.g., 3D printed, CNC machined, injection molded or extruded) using a less rigid, more elastic material (e.g., polymer) as compared to the ball portion. The elasticity of the socket portion allows conformance to the imperfect surface of the ball portion while under pressure to optimize the static friction developed between the ball and socket. In one embodiment, the entire socket portion may be comprised of a single composition (e.g., polymer).

In one embodiment, the socket portion may be composed of a homopolymer acetal (POM-H) that may exhibit a modulus of elasticity that resists permanent deformation as the surface area of the socket is made to conform to the imperfect surface area of the ball while under pressure. As a result, a maximum surface area of the socket may be brought into direct communication with a surface area of the ball (e.g., by allowing the socket to elastically conform to the shape of the ball) to achieve optimum static friction between the respective socket and ball surface areas while the associated attachment (e.g., side-view mirror) remains configured to maintain a position of the attachment relative to the vehicle (e.g., to accommodate the height of a first driver of the vehicle).

Once a reconfiguration of the attachment is needed (e.g., raised to accommodate a taller driver), the ball may be rotated within the socket to achieve the reconfiguration of the position of the attachment relative to the vehicle. In response, the surface area of the socket may once again elastically conform to the imperfect shape of the ball to optimize static friction (e.g., substantially maintain the static friction obtained before the attachment's position relative to the vehicle was reconfigured) thereby optimally maintaining the reconfiguration of the attachment's position relative to the vehicle during operation of the vehicle by the taller driver.

Turning to FIG. 1, vehicle 100 is shown with side-view mirrors 102 and 106 mounted thereon (e.g., to the A-pillars of vehicle 100) using, for example, ball-and-socket joint mounts 104 and 108, respectively, as discussed in more detail below in relation to FIG. 2. Ball-and-socket joint mounts 104 and 108 facilitate optimal use of vehicle 100 in a variety of ways.

Initially, side-view mirrors 102 and 106 may be adjusted (e.g., raised and/or lowered) relative to vehicle 100 via operation of ball-and-socket joint mounts 104 and 108 to correspond to the height of the driver and passenger as needed. The pressure established between the ball and socket (not shown) of ball-and-socket joint mounts 104 and 108, respectively, may cause the surface area of the interior of each socket (not shown) to elastically conform to the surface area of each ball (not shown) thereby maximizing the amount of surface area of the interior of each socket that is in direct communication with the surface area of the associated ball. As such, the orientation of side-view mirrors 102 and 106 relative to vehicle 100 may be stabilized even during operation of vehicle 100 that may impose excessive G-forces onto side-view mirrors 102 and 106.

Further adjustments may be necessary to the orientation of side-view mirrors 102 and 106 via ball-and-socket joint mounts 104 and 108, respectively. As adjustments are made, each ball (not shown) may be rotated within each socket (not shown) until the correct orientation of side-view mirrors 102 and/or 106 is established. Once at rest, the elasticity of each socket (not shown) allows the interior surface of each socket (not shown) to conform to the corresponding surface area of the associated ball (not shown) under pressure. As such, static friction between each ball and socket may once again be optimized.

Figure 2:
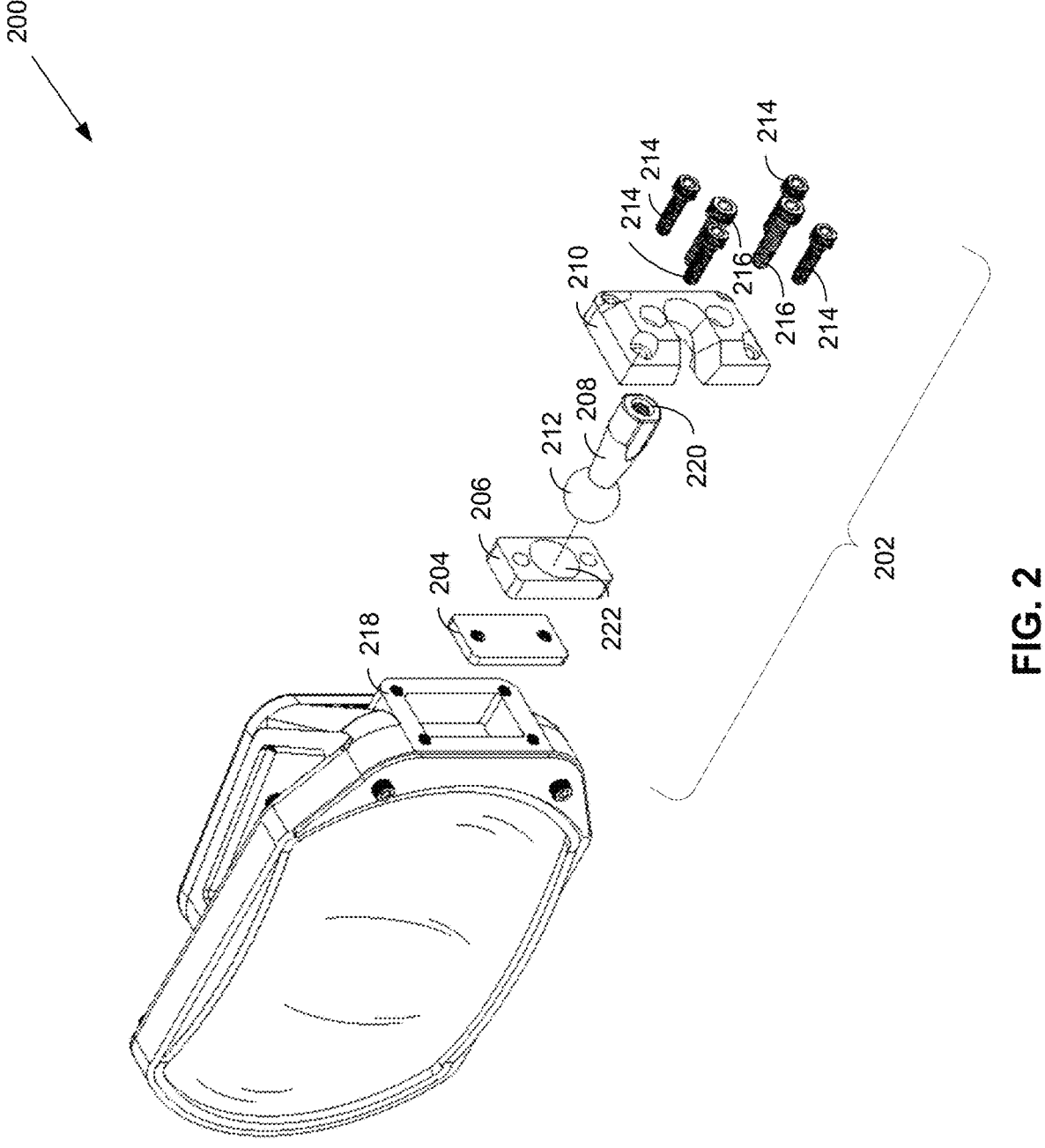
FIG. 2 illustrates an exploded view of a ball-and-socket joint of a side-view mirror in accordance with an embodiment of the present invention.

Turning to FIG. 2, side-view mirror 200 (e.g., as discussed above in relation to side-view mirrors 102 and 106 of FIG. 1) is illustrated in exploded view to exemplify components of ball-and-socket joint mount 202 (e.g., as discussed above in relation to ball-and-socket joint mounts 104 and 108 of FIG. 1). Ball portion 212 of shaft 208 may be arranged within interior portion 222 of socket 206 by operation of the pressure applied by face plate 210 in combination with back plate 204 as fasteners 216 engage back plate 204 to press ball portion 212 of shaft 208 into interior portion 222 of socket 206. Fasteners 214 may engage face plate 210 to configure ball-and-socket joint 202 onto base 218 of side-view mirror 200 without affecting the pressure applied by fasteners 216 to press ball portion 212 into interior portion 222.

Finally, side-view mirror 200 may be attached to a vehicle (e.g., as discussed above in relation to side-view mirrors 102 and 106 of vehicle 100 of FIG. 1) via interface 220. Interface 220 may attach to any corresponding location of a vehicle, such as for example, the A-pillar locations of a vehicle (e.g., as exemplified in FIG. 1) so as to facilitate the driver's and passenger's view along both sides of the vehicle while in operation.

In one embodiment, ball portion 212 and shaft 208 may be formed from a metallic material (e.g., stainless steel) via any number of methods (e.g., a CNC machining process) such that once formed, ball portion 212 may exhibit an imperfect surface area (e.g., non-spherical surface area) due to imperfections (e.g., raised portions and/or divots not shown) that may be caused by the machining process on the surface of ball portion 212. As such, only the raised portions (not shown) of the surface of ball portion 212 may be in initial contact with the surface of interior portion 222 of socket 206 as ball portion 212 is pressed into interior portion 222.

Socket 206 may, for example, be comprised of a non-metallic material such as a polymer (e.g., a thermoplastic), which may more particularly include a homopolymer acetal (POM-H), that may exhibit a modulus of elasticity that resists permanent deformation. Accordingly, as fasteners 216 are tightened into back plate 204, ball portion 212 of shaft 208 imparts increasing pressure onto interior portion 222 of socket 206, which may cause deformation of the shape of the surface of interior portion 222 to conform to the imperfections of the surface of ball portion 212 due to the elastic properties of socket 206. In such an instance, not only are the raised portions (not shown) of the surface of ball portion 212 made to be in direct contact with corresponding portions of the surface of socket 206, but the divots of the surface of ball portion 212 may also be made to come into contact with corresponding portions of the surface of socket 206 as the elastic properties of socket 206 allow conformance to the non-spherical shape of ball portion 212 through non-permanent deformation of socket 206.

The position of side-view mirror 200 in relation to the associated vehicle may be changed by a user of side-view mirror 200 via operation of ball-and-socket joint mount 202. As the position of side-view mirror 200 changes, ball portion 212 of shaft 208 may rotate within interior portion 222 of socket 206 thereby changing the location of surface imperfections (e.g., raised portions and divots of the surface of ball portion 212 not shown) with respect to an associated surface of interior portion 222. Due to the elasticity of socket 206, the initial deformation of interior portion 222 is non-permanent and as such, may be adapted to conform to the new displacement of the imperfections of ball portion 212 as it rotates within interior portion 222. In such an instance, it can be said that temporary deformations of interior portion 222 may be "self-healing" such that the shape of a surface of interior portion 222 may be made to adapt to the irregularities in a shape of a surface of ball portion 212.

Other aspects and embodiments of the present invention will be apparent to those skilled in the art from consideration of the specification and practice of the invention disclosed herein. For example, virtually any vehicle attachment (e.g., rear-view mirrors) and side-view mirrors equipped with forward-facing lights may be advantaged through the application of the ball-and-socket joint mount as discussed herein. It is intended, therefore, that the specification and illustrated embodiments be considered as examples only, with a true scope and spirit of the invention being indicated by the following claims.

What is claimed is:

1. A method of mounting a vehicle accessory to a vehicle, comprising:
    assembling a vehicle accessory mount, the assembly including,
        movably displacing a ball portion of a shaft into an interior portion of a socket by securing the ball portion into the interior portion with a second set of fasteners;
        varying a pressure exerted onto a first surface of the interior portion by a second surface of the ball portion by increasing and decreasing pressure applied by the second set of fasteners; and
        temporarily deforming a first shape of the first surface to substantially conform to a shape of the second surface;
    coupling the vehicle accessory mount to the vehicle accessory via a first set of fasteners; and
    movably coupling the vehicle accessory to the vehicle.

2. The method of claim 1, wherein the increased pressure increases the static friction between the first and second surfaces.

3. The method of claim 1, wherein the decreased pressure decreases the static friction between the first and second surfaces.

4. The method of claim 1, wherein movably coupling the vehicle accessory to the vehicle includes rotating the ball portion of the shaft within the interior portion of the socket.

5. The method of claim 4, wherein the rotating changes a displacement of the first surface relative to the second surface.

6. The method of claim 5, wherein the changed displacement temporarily deforms the first shape of the first surface into a second shape of the first surface.

7. The method of claim 6, wherein deforming the first surface into the first shape imposes a first static friction between the first and second surfaces.

8. The method of claim 7, wherein deforming the first surface into the second shape imposes a second static friction between the first and second surfaces, the second static friction being substantially equal to the first static friction.

* * * * *